United States Patent [19]

Kabat

[11] 4,072,866

[45] Feb. 7, 1978

[54] PROPORTIONAL TEMPERATURE CONTROL SYSTEM INCORPORATING A LINEAR DELAY

[75] Inventor: John L. Kabat, Bloomington, Minn.

[73] Assignee: Honeywell Inc., Minneapolis, Minn.

[21] Appl. No.: 746,378

[22] Filed: Dec. 1, 1976

[51] Int. Cl.² .............................................. H02J 3/14
[52] U.S. Cl. ...................................... 307/41; 307/293; 328/127; 236/1 E; 219/486
[58] Field of Search .................... 307/39, 41, 293, 141, 307/117, 229, 359; 328/129, 127; 62/137; 236/1 E; 219/486, 487

[56] References Cited

U.S. PATENT DOCUMENTS

| 3,390,341 | 6/1968 | Kline | 328/127 |
|---|---|---|---|
| 3,667,055 | 5/1972 | Uchida | 328/127 |
| 3,729,615 | 4/1973 | Harris | 219/486 |
| 3,814,352 | 6/1974 | Grimes | 328/127 X |
| 3,836,791 | 9/1974 | Galloway | 307/293 |

Primary Examiner—Robert K. Schaefer
Assistant Examiner—Morris Ginsburg
Attorney, Agent, or Firm—Alfred N. Feldman

[57] ABSTRACT

A proportional temperature control system using a linear time delay circuit provides an output voltage that is similar to the output voltage of a thermostat but delayed in time. The delay circuit is a linear rate time delay system that compares a called for voltage shift at its input to the output voltage of an integrator circuit to provide a substantially linear rate of time delay. The comparator circuit and the integrator circuit are separated by a limiter so that regardless of the amount of the initial offset in voltage at the comparator, the rate of integration is always maintained the same.

11 Claims, 4 Drawing Figures

PROPORTIONAL TEMPERATURE CONTROL SYSTEM INCORPORATING A LINEAR DELAY

BACKGROUND OF THE INVENTION

In many types of control circuits, and particularly in proportional temperature control circuits, it is necessary to provide a minimum time delay between the various stages of heating and/or cooling. In present day temperature control systems it has become common practice to provide a number of stages of heating and a number of stages of cooling so that the most efficient system can be developed. This is particularly true where electric heat has been used and a number of heating elements are progressively staged on and off. This is also true where cooling is involved. A number of compressors or cooling stages are staged on and off.

If no time delay function is provided in the staging of either the heating or the cooling equipment, any sudden change of the set point of the control thermostat can cause a number of stages to be called for at the same time. This same type of undesirable function also occurs whenever there is a momentary loss of power to the system and then the return of power. It can be readily understood that it is undesirable, if a number of stages of electric heat, or a number of cooling compressors are operating, to have them suddenly deenergized by a power failure and then all simultaneously reenergized when power is restored. This undesirable control action has been prevented by the use of some type of time delay element in the staging of the heating and cooling equipment. Most of the time delays currently being used are of the time constant type, where the amount of delay is proportional to the magnitude of the demand of the signal and is nonlinear as more and more stages are either turned on or off. Other types of time delays have been used that require a delay circuit for each of the heating or cooling stages. Where individual delay circuits are used for each stage, the delays can be made equal, but the expense of the circuitry makes their use prohibitive.

SUMMARY OF THE INVENTION

The present invention is directed particularly to the proportional temperature control art where a number of heating and/or cooling stages are used. This would be most typically where a number of stages of electric heat are used for the heating of a space, and where a number of individual compressors or stages of cooling are used when cooling is desired. The invention in the present application is directed to a linear rate time delay system that receives a proportional output voltage from a proportional heating or cooling control thermostat, and then acts upon that signal to provide a time delay that varies linearly in time but which requires a single time delay circuit regardless of the number of stages that are to be controlled.

The present time delay system utilizes a comparator circuit which compares the voltage from the thermostat to the output voltage of the time delay circuit. After the comparator has made a determination that a time delay is necessary, its output voltage is limited to a very narrow range so the amount of offset from the comparator is not a factor in the time delay element. The limited voltage is then fed to an integrating circuit where the non-linear integration of the voltage with time occurs. This voltage is then fed back to the comparator and is used for a basis of determining the total amount of delay. The total amount of delay varies with the magnitude of signal and is substantially linear in the present system.

DESCRIPTION OF THE PREFERRED EMBODIMENTS

Figure 1:
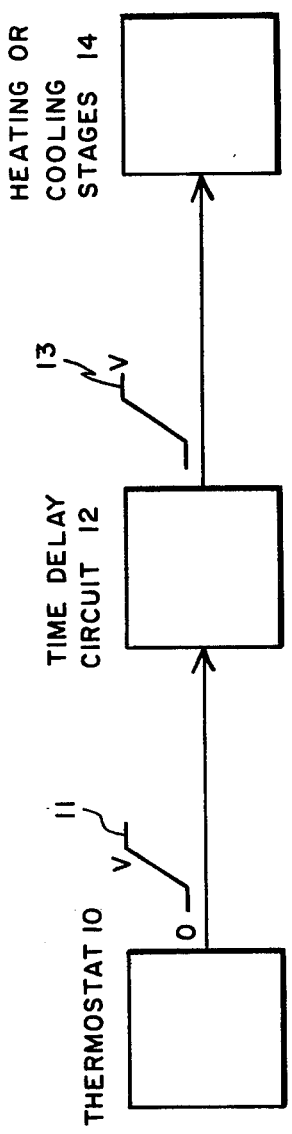
FIG. 1 is a block diagram of a typical proportional temperature control system.
Figure 1:
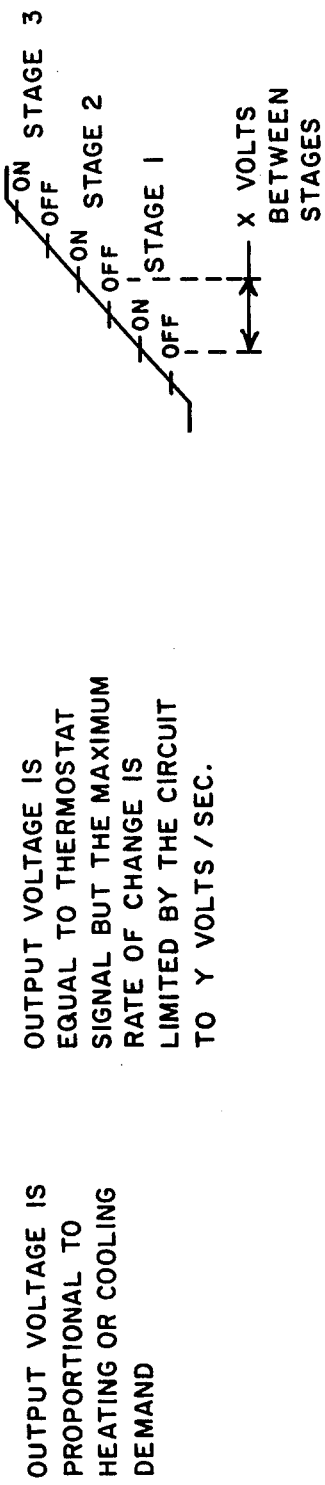

In FIG. 1 there is disclosed a proportional temperature control system which incorporates a linear time delay circuit to control the sequencing of heating or cooling stages in response to the thermostat. The thermostat 10 is disclosed as having an output voltage 11 with the output voltage being proportional to either a heating or cooling demand. The thermostat 10 is typically a thermostat which generates a ramp type of voltage of one slope for heating and of a reverse slope for cooling. Thermostat means 10 normally is electronic in internal structure and has a temperature offset between the heating and cooling ramp voltages to prevent an accidental demand for heating and cooling at the same time. The thermostat means 10 is disclosed as having a ramp voltage 11 that is fed to a linear time delay circuit means 12. The linear time delay circuit means 12 is of the type disclosed in FIGS. 2 or 4 of the present application and provides for an output voltage 13 that is similar to the thermostat means voltage 11, but with a maximum rate of change limited by the time delay circuit means 12 to a fixed number of volts per second.

The time delayed ramp voltage 13 is then fed to either a heating or cooling device 14 which has a number of individually controlled stages. The staging of the heating or cooling portion 14 is disclosed as a ramp having three individual stages with a differential of a fixed number of volts between the individual stages. In the specific example disclosed in FIG. 1, the minimum time delay between the stages is a function of the differential voltage between the stages times the volts per second change of the time delay circuit means. It will thus be understood that as the time delay circuit 12 causes the output voltage 13 to be delayed in time, that the individual heating or cooling stages 14 are sequenced on and off with a linear time delay between the operation of each of the stages.

Figure 2:
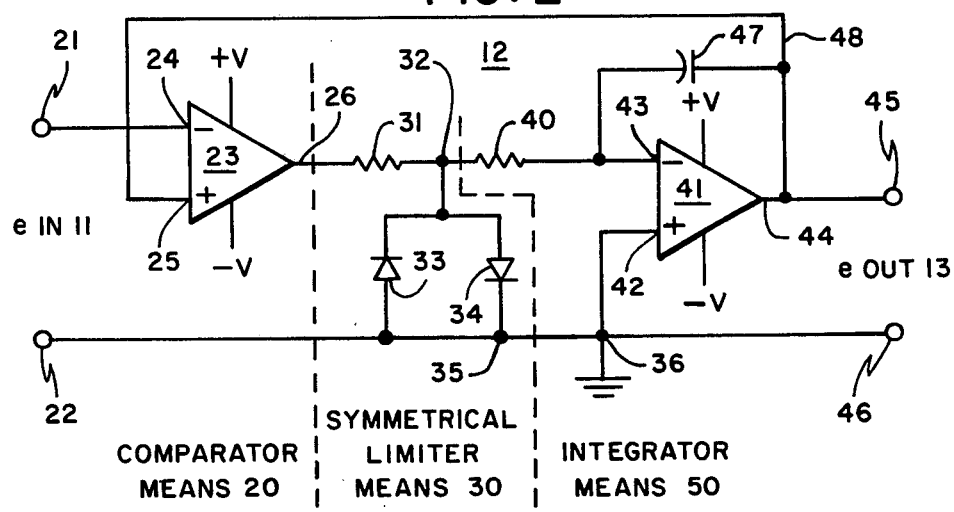
FIG. 2 is a highly simplified schematic of the time delay system.

In FIG. 2 there is a simplified disclosure of the time delay circuit means 12. The time delay circuit means 12 has a pair of input terminals 21 and 22 to receive the input ramp voltage 11. The terminal 21 is connected to an operational amplifier generally disclosed at 23 at the inverting terminal 24. A non-inverting terminal 25 is also disclosed as is an output connection 26. The operational amplifier 23 is supplied with both a positive and a negative voltage as is conventional for operational amplifiers. The elements just described have been disclosed as the lefthand portion of the circuitry and are identified as a comparator means 20. The comparator means 20 compares the voltages between the non-inverting terminal 25 and the inverting terminal 24 to either supply a full positive voltage at 26 or a full negative voltage at 26, in the ideal case.

The output 26 is connected to a limiter means 30 that is disclosed as a symmetrical limiter means including a resistor 31 connected to a junction 32 and a pair of back-to-back connected diodes 33 and 34. The diodes 33 and 34 are connected in turn to a common point 35 which is grounded at 36 and connected to the terminal 22. The back-to-back diodes 33 and 34 provide a symmetrical limiting or clipping action of the voltage that is supplied at the junction 32 to the symmetrical limiter means 30 and with conventional diodes the voltage maximum between the points 32 and 35 is in the order of one-half of one volt.

The circuit is completed by the provision of an integrator means 50 that includes a resistor 40 connected to the junction 32 and further connected to a second operational amplifier 41 having a non-inverting terminal 42 and an inverting terminal 43. The inverting terminal 43 is connected to the resistor 40 while the non-inverting terminal 42 is connected at 36 to ground. The operational amplifier 41 has an output at 44 that is connected to a terminal 45 and a further terminal 46. The terminal 46 is common to the ground 36 and the terminal 22. To complete the integrator means 50, an integrating capacitor 47 is connected between the output 44 of the operational amplifier 41 and the inverting terminal 43 of the operational amplifier 41. Also provided is a feedback conductor 48 which connects the output 44 of the operational amplifier 41 to the non-inverting terminal 25 of the operational 23. It is thus apparent that the integrating action of the capacitor 47 is fed back to the comparator means 20 and this action will be described in more detail in connection with the voltage versus time wave forms disclosed in FIG. 3.

Figure 3:
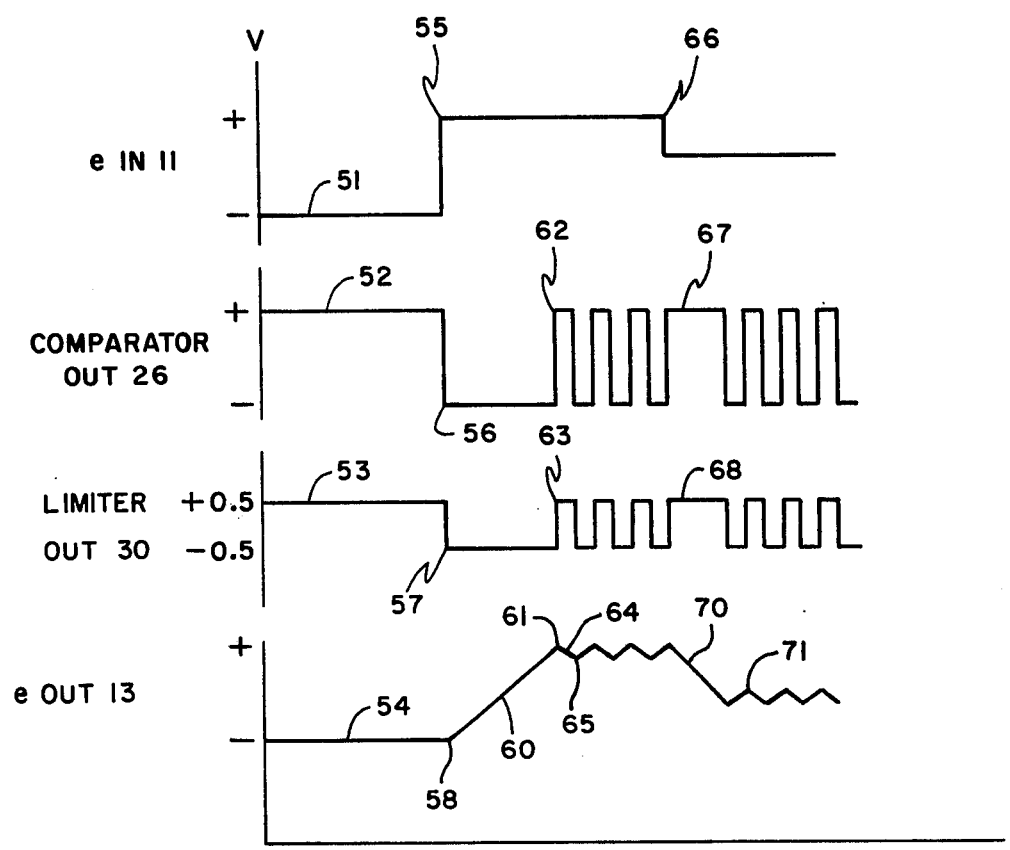
FIG. 3 is a group of voltage versus time graphs of the circuit of FIG. 2.

In FIG. 3 four different wave forms at different portions of the circuit of FIG. 2 are disclosed. The wave forms are voltage versus time wave forms and it should be understood that the voltage scale has been selected for each wave form for convenience in showing the wave form and is not representative of an exact voltage level for comparative or scaling purposes. The upper most wave form is the input voltage 11 to the comparator means 20. The second wave form is the voltage output of the comparator means 20 at conductor 26. The third wave form is the voltage output of the symmetrical limiter means 30 as seen between the non-inverting terminal 42 and the inverting terminal 43 of the operational amplifier 41. In the fourth wave form is the output voltage 13 of the linear time delay circuit.

Initially the wave forms can be considered as at a time when the thermostat means voltage 11 is low or has been interrupted, say at a changeover time when the heating to cooling control system has just been operated. At that time the input voltage 11 is at some negative level 51. This places the inverting terminal 24 at a very low value and the output 26 is inverted and shown as a high voltage at 52. This relatively high voltage is clipped by the symmetrical limiter means 30 and supplies a slight positive potential 53. The slight positive voltage 53 is then supplied to the inverting terminal 43 of the operational amplifier 41 where it is inverted and the output voltage at 44 is driven low as disclosed at 54. The portion of the voltage wave forms that have been described at 51, 52, 53 and 54 are not a normal operating point, but at a changeover or switching point and have been disclosed as a beginning reference to explain the operation of the circuit of FIG. 2.

If the input voltage at terminals 21 and 22 suddenly becomes positive, as with the application of a ramp voltage from the thermostat means 10 as disclosed at 55, the inverting terminal 24 of the comparator means 20 causes the output 26 to be driven low at 56. As soon as the low voltage 56 is provided at the output 26 of the comparator means 20, the voltage from the symmetrical limiter means 30 is driven to a negative level 57 and the inverting terminal 43 causes the operational amplifier 41 to switch in attempt to drive the voltage at the output 44 to the higher voltage as indicated at 58. Since the operational amplifier 41 is paralleled by a negative feedback capacitor 47, the operational amplifier 41 acts as an integrator. An integrated or time delayed ramp voltage 60, as disclosed in the fourth voltage wave form, is generated. The voltage rises at a rate determined by the circuit components of the integrator means 50 until the operational amplifier 41 reaches its full applied voltage at 61. At this point in time the comparator means 20 is now receiving a positive voltage at the non-inverting terminal 25 and the operational amplifier 23 suddenly switches at 62 to a relatively high voltage. At this point the symmetrical limiter means 30 again supplies a positive voltage 63 to the integrator means 50 causing the operational amplifier 41 to switch to its low voltage thereby causing a downward sloped integrated voltage 64. This continues until the voltage 64 reaches a point 65 at which time the comparator means 20 again is caused to switch and reverses in a continuing cyclic manner with the voltage of the curve between 61 and 65 varying in a range of approximately 3 millivolts. The voltage level has been exaggerated in the drawing of FIG. 3 in order to emphasize the operation, but it should be understood that the cyclic range in the output voltage is exceedingly small due to the exceedingly high gain of the operational amplifiers 23 and 41.

As long as the voltage 55 on the input of terminals 21 and 22 of the comparator means 20 stays fixed the output voltage between terminals 45 and 46 will vary cyclically over approximately the three millivolt range with the comparator reversing pluralities and the integrator means 50 integrating and feeding back the change in order to cause the switching action to continue.

If there is any sudden change in the input applied voltage, such as at 66, where the voltage is shown as dropping, the comparator output voltage 67 becomes stable for some period of time as does the output voltage of the symmetrical limiter means 30 as at 68. During this period of time a time delay slope output 70 of a linear nature is generated before the cyclic operation shown at 71 again occurs, but at a proportionately lower voltage that corresponds to the drop in voltage at 66 as shown at the input between terminals 21 and 22.

From the above, it can be seen that any sudden change in the input voltage to the linear time delay circuit means 12 causes a linear time delay until a new operating level is reached. At this time the device cycles in a very narrow range maintaining a correspondence between the input voltage from a thermostat means 10 to the heating or cooling stages 14 of the system as described in FIG. 1. The present system protects against power failure interruptions, sudden changes in the system, or someone suddenly changing the setting of a thermostat. Any of these changes causes the system to stage the heating or cooling equipment on with a time delay interval between the individual stage thereby protecting the equipment and the electrical service from any overload.

Figure 4:
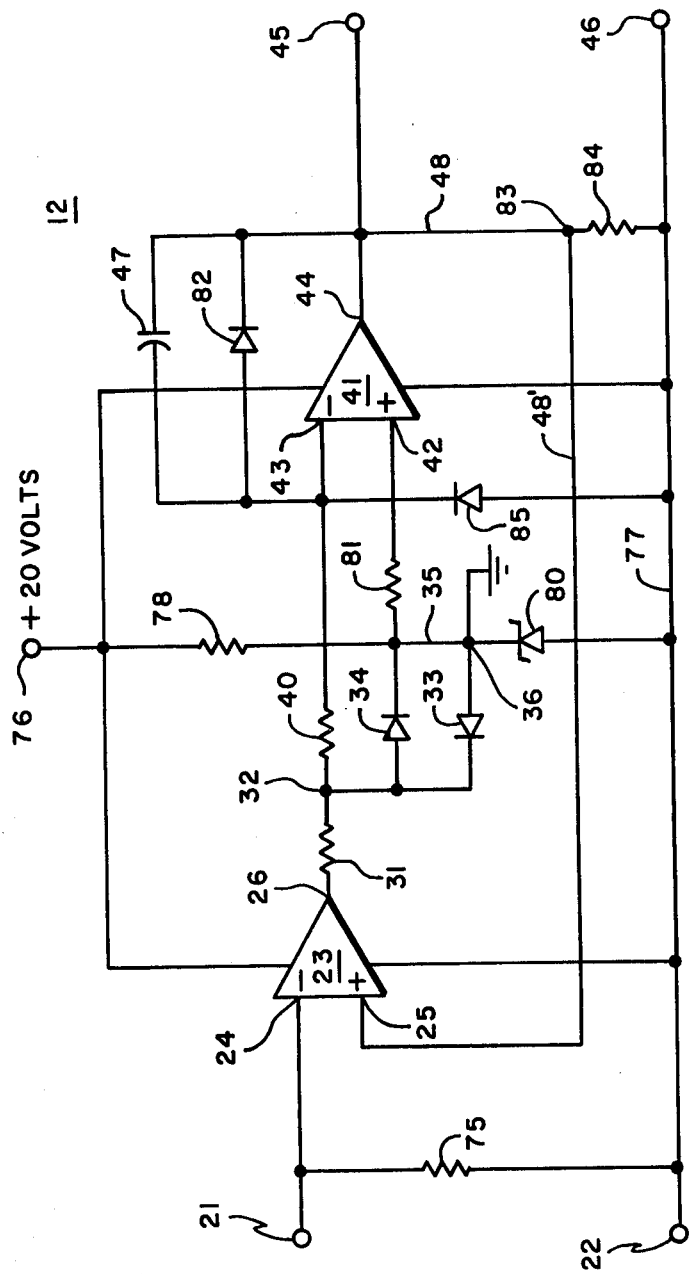
FIG. 4 is an actual circuit diagram of a practical embodiment of the linear rate time delay circuit.

In FIG. 4 there is disclosed a linear time delay circuit means 12 of a practical embodiment and which will be described in detail. The sections of the device generally correspond to the disclosure of FIG. 2 but additional components have been added for reasons that will be brought out in the following description. The input terminals 21 and 22 are again provided along with the inverting terminal 24 and the non-inverting terminal 25 of an operational amplifier 23. A resistor 75 is connected between the terminals 21 and 22 and is provided to pull terminal 21 low in the event that a signal is lost to the terminal 21 from the thermostat means 10, as is the case during a changeover switching operation. A single ended power supply 76 with a positive voltage is connected to both the operational amplifier 23 and the operational amplifier 41. The negative or power supply ground is connected to the common conductor 77 which joins the terminals 22 and 46. In order to obtain a circuit ground potential between the voltages applied between the terminal 76 and the conductor 77, a zener diode 80 is provided and provides a circuit ground 36 for the system which is above the potential of the conductors 77 but below the power supply input 76. By the use of the zener diode 80 it is possible to use a single ended power supply to obtain the necessary power supply ground and circuit ground at different voltage levels. Once again the output of the operational amplifier 23 is connected to a resistor 31 that in turn has the common connection 32 to a pair of back-to-back diodes 33 and 34 that are connected in common at 35.

A resistor 40 connects the junction 32 to the inverting terminal 43 of the operational amplifier 41 while an additional resistor 81 connects the common conductor 35 to the non-inverting terminal 42 of the operational amplifier 41.

Connected around the operational amplifier 41 from its output 44 to the inverting terminal 43 is the integrating capacitor 47. The integrating capacitor 47 is protected from reverse voltage by a diode 82 that is connected in parallel therewith. The conductor 48 which connects the output 44 of the operational amplifier 41 to the non-inverting terminal 25 of the operational amplifier 23 is again disclosed in two portions 48 and 48'. The conductors 48 and 48' are joined at 83 and connected by resistance 84 to the conductor 77. The circuitry is completed by placing a further diode 85 between the power supply ground and the inverting terminal 43 of the operational amplifier 41. The conductor 48, resistor 84 and diode 85 are provided to rapidly discharge the capacitor 47 whenever there is a power failure or transient type of operation thereby resetting the integrating operation immediately.

In the circuit described in FIG. 4, the basic operation is the same as that in FIG. 2, but some additional practical considerations have been provided for. The following is a list of typical component values for the circuit of FIG. 4.

Table of Values:

| | |
|---|---|
| Amplifiers 23 and 41 | - μA741 |
| Resistor 75 | - 100,000 ohms |
| Resistor 31 | - 75,000 ohms |
| Resistors 40 and 81 | - 499,000 ohms |
| Resistor 78 | - 5,600 ohms |
| Resistor 84 | 10,000 ohms |
| Diodes 33, 34, 82, 85 | - DA1724 |
| Zener Diode 80 | - IN746A |
| Capacitor 47 | - 68 microfarads |

The table of value for FIG. 4 are typical of one embodiment and have been provided as an example only, and form no limitation in the scope of the present invention.

The operation of the circuit of FIG. 4 is substantially the same as that of FIG. 2 but with the refinements of the single ended power supply, the open circuit protection of the resistor 75, and the reverse voltage protection and discharge capabilities for the integrating capacitor 47. The present invention has been specifically disclosed as applied to a particular type of proportional temperature control system, and as an individual linear rate time delay system within the proportional temperature control system. It is quite apparent that the invention can be applied in numerous applications and can be varied in component configuration. For that reason, the applicant wishes to be limited in the scope of his invention solely by the scope of the appended claims.

The embodiments of the invention in which an exclusive property or right is claimed are defined as follows:

1. A linear rate time delay system, including: comparator means having input circuit means and output circuit means; voltage limiting means connected to said comparator output circuit means to receive an output voltage from said comparator means with said output voltage being limited in amplitude in both a positive and a negative sense with respect to a reference voltage; integrating amplifier means having an input connected to said voltage limiting means and further having output circuit means; said integrating amplifier means including capacitor means; and said integrating amplifier output circuit means connected to said comparator means input circuit means wherein said comparator means compares an input voltage with an integrating amplifier output voltage; said integrating amplifier output voltage being delayed with respect to time by said capacitor means whenever said input voltage of said comparator means changes an amount greater than a level set by said voltage limiting means.

2. A linear time delay system as described in claim 1 wherein said integrating amplifier means includes an operational amplifier; and said capacitor means is an integrating capacitor.

3. A linear time delay system as described in claim 2 wherein said voltage limiting means is a pair of back-to-back connected diodes.

4. A linear time delay system as described in claim 3 wherein said comparator means is an operational amplifier having a non-inverting terminal coupled to the output voltage of said integrating amplifier means.

5. A linear time delay system as described in claim 4 wherein said operational amplifiers are energized from a common voltage source with said voltage source further including voltage breakdown means establishing said reference voltage.

6. A linear time delay system as described in claim 5 wherein said voltage breakdown means is a zener diode.

7. A linear time delay system as described in claim 6 wherein said integrating capacitor is connected in parallel circuit with a resistor and a diode to rapidly discharge said capacitor in the event of a power interruption.

8. A proportional temperature control system, including: thermostat means generating an output voltage proportional to an ambient temperature; comparator means having input circuit means and output circuit means with said input circuit means coupled to said thermostat means output voltage; voltage limiting means connected to said comparator output circuit means to receive an output voltage from said comparator means with said output voltage being limited in amplitude in both a positive and a negative sense with respect to a reference voltage; integrating amplifier means having an input connected to said voltage limiting means and further having output circuit means; said integrating amplifier means including capacitor means; and said integrating amplifier output circuit means connected to said comparator means input circuit means wherein said comparator means compares an input voltage with an integrating amplifier output voltage; said integrating amplifier output voltage being delayed with respect to time by said capacitor means whenever said input voltage of said comparator means changes an amount greater than a level set by said voltage limiting means to prevent said temperature control system from shifting at an undesirable rate.

9. A proportional temperature control system as described in claim 8 wherein said integrating amplifier means includes an operational amplifier; said capacitor means is an integrating capacitor; and said voltage limiting means is a pair of back-to-back connected diodes.

10. A proportional temperature control system as described in claim 9 wherein said comparator means is an operational amplifier having a non-inverting terminal coupled to an output voltage of said integrating amplifier means.

11. A proportional temperature control system as described in claim 10 wherein said operational amplifier are energized from a common voltage source with said voltage source further including a zener diode to establish said reference voltage.

* * * * *

UNITED STATES PATENT OFFICE
CERTIFICATE OF CORRECTION

PATENT NO. : 4,072,866
DATED : February 7, 1978
INVENTOR(S) : JOHN L. KABAT

It is certified that error appears in the above–identified patent and that said Letters Patent are hereby corrected as shown below:

Please amend claim 11, line 2, as follows:

Please delete "amplifier" and insert --amplifiers--.

Signed and Sealed this

Sixth Day of June 1978

[SEAL]

Attest:

RUTH C. MASON
Attesting Officer

DONALD W. BANNER
Commissioner of Patents and Trademarks